(12) United States Patent
Kurz et al.

(10) Patent No.: US 11,680,619 B2
(45) Date of Patent: Jun. 20, 2023

(54) BRAKE SYSTEM DAMPING DEVICE

(71) Applicant: Robert Bosch GmbH, Stuttgart (DE)

(72) Inventors: Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 16/863,670

(22) Filed: Apr. 30, 2020

(65) Prior Publication Data

US 2020/0386291 A1 Dec. 10, 2020

(30) Foreign Application Priority Data

Jun. 8, 2019 (DE) ..................... 10 2019 208 406.0

(51) Int. Cl.
*F16F 9/05* (2006.01)
*F15B 21/00* (2006.01)

(52) U.S. Cl.
CPC .............. *F16F 9/05* (2013.01); *F15B 21/008* (2013.01)

(58) Field of Classification Search
CPC .. F16F 9/05; F16F 9/0454; F16F 9/057; F16F 13/002; F16F 9/0409; F16F 2230/10; F16F 9/084; F16F 9/049; F16F 9/0463; F16F 13/08; F16F 9/04; F16F 9/54; F16F 9/08; F16F 9/103; F16F 9/088; F16F 2226/04; F16F 9/0281; F16F 9/06; F16F 9/18; B60T 8/4068
See application file for complete search history.

(56) References Cited

U.S. PATENT DOCUMENTS 5,655,569 A * 8/1997 Tackett ................. B60T 8/4275
220/721
6,164,336 A * 12/2000 Pasquet ................... B60T 8/409
138/30

(Continued)

FOREIGN PATENT DOCUMENTS

DE 195 38 615 A1 4/1997
DE 19948444 A1 * 4/2001 ............ B60T 8/4068

(Continued)

*Primary Examiner* — Bradley T King
*Assistant Examiner* — Mahbubur Rashid
(74) *Attorney, Agent, or Firm* — Maginot, Moore & Beck LLP

(57) ABSTRACT

A brake system damping device includes a first chamber on which hydraulic pressure is to be applied, a second chamber with a compressible medium located therein, and a first separating element configured to separate the first and second chambers. The damping device further includes a third chamber with a compressible medium located therein and a second separating element configured to separate the second and third chambers. The second and third chambers are connected in a medium-conducting manner via a passage in the second separating element. The first separating element is configured to move a closure element to close the passage when the hydraulic pressure in the first chamber has reached a predefined pressure value. The first and second separating elements form an assembly in which the first and second separating elements extend along an axis and the first separating element is covered radially on the outside by an envelope surface.

18 Claims, 4 Drawing Sheets

(56) References Cited

U.S. PATENT DOCUMENTS

| | | | | |
|---|---|---|---|---|
| 7,240,696 B2 * | 7/2007 | Schlitzkus | .............. | B60T 17/00 138/30 |
| 2012/0133201 A1 * | 5/2012 | Zeoli | ..................... | B60T 8/4068 303/11 |
| 2014/0000740 A1 * | 1/2014 | Wald | ......................... | F15B 1/04 138/30 |
| 2015/0337868 A1 * | 11/2015 | Hashida | .................. | F16L 55/04 138/30 |
| 2016/0001754 A1 * | 1/2016 | Kim | ..................... | B60T 8/4068 303/87 |
| 2017/0057478 A1 * | 3/2017 | Her | ....................... | B60T 8/4068 |
| 2017/0217416 A1 * | 8/2017 | Yang | ...................... | F15B 1/021 |

FOREIGN PATENT DOCUMENTS

| | | | | |
|---|---|---|---|---|
| DE | 102013006991 A1 * | 10/2013 | .............. | B60T 17/04 |
| DE | 102018219605 A1 * | 1/2020 | .............. | B60T 11/10 |
| DE | 102019202018 A1 * | 1/2020 | .............. | B60T 11/10 |
| DE | 102019208413 A1 * | 1/2020 | ............. | B60T 11/102 |
| DE | 102019209881 A1 * | 1/2020 | .............. | B60T 15/36 |
| EP | 0921049 A2 * | 6/1999 | | |
| EP | 1657133 A2 * | 5/2006 | .............. | B60T 17/06 |
| EP | 1839982 A2 * | 10/2007 | ............ | B60T 8/3225 |
| EP | 2105363 A1 * | 9/2009 | .............. | B60T 17/06 |
| WO | WO 0181812 A1 * | 11/2001 | | |
| WO | WO-2011028376 A2 * | 3/2011 | .............. | B60T 17/02 |

* cited by examiner

BRAKE SYSTEM DAMPING DEVICE

This application claims priority under 35 U.S.C. § 119 to patent application no. DE 10 2019 208 406.0, filed on Jun. 8, 2019 in Germany, the disclosure of which is incorporated herein by reference in its entirety.

BACKGROUND

The disclosure relates to a brake system damping device with a first chamber on which hydraulic pressure is to be applied and a second chamber in which a compressible medium is located, and a first separating element for separating the first chamber from the second chamber.

Brake systems, in particular hydraulic brake systems, serve to slow down a driving speed of vehicles such as cars and HGVs. During operation of such brake systems, various dynamic effects occur, among other things, pressure fluctuations in lines and chambers present there which lead to vibrations or pulsations and as a result to undesirable noises and vibrations. In order to minimize such vibrations or achieve a damping effect in the case of these vibrations, brake system damping devices, also referred to below as dampers, are used at one or more installation locations in the brake system. These dampers comprise a first chamber in which a hydraulic pressure is to be applied. The chamber is in principle a type of container. The pressure is in principle the result of a force acting on a surface. A force is transmitted hydraulically, i.e. via a pressurized fluid, in the dampers.

Dampers are known with a separating element which separates the chamber into a first chamber, in which a liquid or a fluid is located, and a second chamber, in which a compressible medium, generally in the form of a gas, is located. The volume of a chamber of a deformable container, in which a gas is located, is known to reduce if an elevated pressure is exerted on this container from the outside. The volume of the second chamber is equally also reduced by means of the separating element if a hydraulic pressure is applied on the first chamber.

If this pressure once again drops, the volume of the gas and thus of the second chamber correspondingly also increases again. The second chamber therefore acts like a pneumatic spring, also referred to as a gas spring. How soft or hard this gas spring damps is dependent on the gas volume of the second chamber. The greater the gas volume, the softer the damping.

During a braking operation, a vehicle driver steps on a brake pedal which passes through a pedal travel. This pedal travel is directly related to the gas volume of the second chamber which is relevant here. The greater the gas volume, the longer the pedal travel. The positive effect of soft damping thus runs counter to the negative effect of a large pedal travel length.

The object on which the disclosure is based is to provide a device for vibration damping in a brake system with improved damping properties.

SUMMARY

According to the disclosure, a brake system damping device is created with a first chamber on which hydraulic pressure is to be applied and a second chamber in which a compressible medium is located, and a first separating element for separating the first chamber from the second chamber. The object is achieved according to the disclosure in that the brake system damping device has a third chamber in which the compressible medium is also located and a second separating element for separating the second chamber from the third chamber. The second chamber is connected to the third chamber in a medium-conducting manner by means of a passage configured in the second separating element. Moreover, a closure element is to be moved with the first separating element, by means of which closure element the passage is to be closed, as soon as, in the first chamber, the hydraulic pressure has reached a predefined pressure value.

The third chamber therefore contains, like the second chamber, the compressible medium which is preferably configured with a gas and particularly preferably with air. The second separating elements separates the third chamber from the second chamber, wherein the two chambers, however, initially remain connected by means of the medium-conducting passage. The passage or the link is preferably configured with a simple bore and can be closed by means of the closure element of the first separating element. The closure element is preferably simply a surface region on the surface of the first separating element. This closure element only closes the passage when an adequate hydraulic pressure for this is present in the first chamber. Concretely, the first separating element is in particular deformed from the predefined pressure value to such an extent that it is then applied on the second separating element. The second separating element therefore preferably forms a stop for the closure element.

As a result of the closed passage, the third chamber is then uncoupled from the second chamber and is thus no longer available for the remaining damper. Only the medium volume in the second chamber remains for the further damping action above a predefined pressure value. This is thus relatively small as a result of the first separating element deformed in the direction of the second separating element. The damper according to the disclosure thus only still has a lower elasticity and damping action since the second chamber is barely able to still take up volume. The advantageous effect is, however, that thus a pedal travel or the travel of a brake pedal of the brake system is no longer significantly lengthened in the event of an actuation by means of a vehicle driver. Upon closure of the passage, the first separating element particularly advantageously even bears completely against the inner wall of the second chamber, including the side of the second separating element facing the second chamber, so that the second chamber entirely disappears or no longer has any volume. The pedal travel is then no longer lengthened in the first place from the predefined pressure value. The damping action which is also reduced as a result of this is acceptable since the pressure range which is relevant for the damping lies below the predefined pressure value.

The pressure value is therefore preferably selected or predefined so that it represents the upper threshold value of a pressure range which is relevant for the damping. The respective volumes of the second and third chamber are preferably adjusted to the relevant pressure range and the desired elasticity or damping action of the damper. In this advantageous manner, the damper connects the large elasticity of the large medium volume in the pressure range relevant for the damping with a restriction of the volume which can be taken up by the first chamber above this pressure range. In other words, there is no direct relationship any more between the displaced volume of brake medium and the medium volume used for the damping. The damper thus offers outstanding damping properties in the case of a short pedal travel.

A further advantage of the disclosure is that the pressure in the closed off third chamber is significantly lower than the pressure in the second chamber without passage to a further chamber, i.e. in the case of the prior art. Undesirable effects are reduced as a result of this. On one hand, in the case of low pressure, the permeation through the first separating element is reduced, on the other hand, the temperature of the medium at low pressure is not so high, as a result of which material aging of the first separating element is delayed.

Furthermore, according to the disclosure, the first separating element and the second separating element are to be preassembled to form an assembly in which the first and second separating elements extend along an axis and the first separating element is covered radially on the outside at least in certain portions by means of an envelope surface. The envelope surface is in this case in particular of rigid or stiff form, whereas the first separating element is flexible or elastic.

By means of the envelope surface of this type, a sliding surface is formed on the outside on the first separating element, along which sliding surface the assembly that is formed can advantageously be inserted and mounted into an associated housing. The feed and mounting of the assembly formed according to the disclosure can thus be automated in an effective manner, and then performed automatically. Customer acceptance and market opportunities of vehicles which are fitted with the brake system damping device according to the disclosure can be significantly improved with the aid of the listed technical advantages.

The envelope surface may be formed as a coating on the first separating element itself. It is advantageous according to the disclosure if the envelope surface is formed by a hollow cylindrical sleeve, which is in particular pushed onto the first separating element. The sleeve forms an initially separate component which is to be pushed onto the assembly formed from at least first and second separating element. Although this generates additional outlay, this outlay is however outweighed by the advantages thereby achieved, of improved handlability and mountability of the assembly. The sleeve is in this case particularly preferably composed of metal, and in particular produced as a thin-walled sheet-metal part and by means of deep-drawing.

The envelope surface, in particular sleeve, is furthermore advantageously configured with a radially external interference fit for pressing into a housing which receives the assembly. A positionally accurate and at the same time force-fitting, stationary position of the assembly in the housing is to be produced by means of the interference fit. At the same time, the interference fit may also be configured so as to be substantially or else completely fluid-tight.

In one refinement of the disclosure, it is also advantageous that the envelope surface is configured with a radially internal first insertion bevel for facilitated pushing of the envelope surface onto the first separating element and/or with a radially external second insertion bevel for facilitated insertion of the envelope surface into a housing which receives the assembly. By means of the insertion bevels, it is in particular possible for the mounting of the brake system damping device according to disclosure to be automated considerably less expensively and in a more reliable manner in terms of a process.

The envelope surface is furthermore preferably configured with a radially external shoulder for support on a housing which receives the assembly. The shoulder may advantageously serve as a stop surface and/or as an interference-fit seat for the assembly mounted into the housing.

The second separating element is preferably supported by a cover, by means of which the third chamber is simultaneously delimited. Here, the second separating element is advantageously held preceding from or in the cover by means of an interference fit. The cover is then provided as a closure for a brake system with the brake system damping device according to the disclosure and enables flexible access to the brake system. As a result of this, a simple replacement of the first or second separating element may also be possible. Moreover, brake system damping devices which hitherto only use a chamber between the cover and an elastic separating element for damping can be retrofitted with the second separating element.

By virtue of the fact that the third chamber is formed by means of the second separating element and a cover and the second separating element is retained on the cover by means of an interference fit in a fluid-impervious manner, a connection which is impervious over the period of operation and can at the same time be produced advantageously in terms of assembly is created between the cover and the second separating element. This ensures in particular that the third chamber formed behind the second separating element is permanently impervious and no fluid can travel out of it to the outside past the cover.

The second separating element preferably extends along an axis and the interference fit is formed radially on the outside on the second separating element. Such interference fit has a preferably large surface and thus a large sealing-off region. Moreover, with such an interference fit, an advantageous material combination of a cover composed of metal and a second separating element composed of plastic can be selected.

If the second separating element extends along an axis, it is furthermore advantageous that the second separating element also has a shoulder which is substantially radially directed against which the first separating element bears in a sealing manner. A hydraulic force acts in the axial direction and thus transverse to the orientation of the shoulder on the radially directed shoulder in the case of a pressure increase in the first chamber. This hydraulic force pushes a first separating element bearing against the shoulder substantially perpendicularly against the shoulder so that the first separating element is pressed on there advantageously additionally in a sealing manner.

Building on this, the second separating element is preferably fully enclosed by the cover and the first separating element. As a result of this, the second and third chamber with the contained medium volume are additionally sealed off. Complete enclosure of the second separating element also means that the combination of these three components does not differ externally from a combination only of cover and first separating element. As a result of this, the configuration of the second separating element is independent of the further brake system. Even a removal of the second separating element from the damper is thus possible preferably if a larger medium volume is required.

It is furthermore advantageous if the first separating element has an annular sealing bead with which it bears against the second separating element and in particular against the cover which supports the second separating element in a sealing manner. Such a sealing bead then forms a central sealing element by means of which both the first as well as the second and third chamber are advantageously delimited from one another. Such a solution is furthermore particularly installation space-saving since three sealing points are realized with only one sealing element.

In the case of a further advantageous further development of the disclosure, the first separating element is formed in one piece with the closure element. In one piece means that two elements, here the first separating element and the closure element, are formed in one piece or as one part. This has the advantage of simple assembly and low-cost production.

In the case of a next advantageous further development of the disclosure, the first separating element is configured with a diaphragm, preferably with a roller diaphragm. Diaphragms are to be understood here in principle as sealing elements which, as elastic, movable separating walls or separating elements, separate two chambers hermetically from one another. Roller diaphragms are especially provided only for one-sided pressure loading in the direction of a loop inside or diaphragm head depression. Only a negligibly low inherent rigidity and a low degree of resistance to elastic deformation of roller diaphragms oppose changes in volume. Roller diaphragms are therefore particularly well suited as a separating element for the brake system damping device according to the disclosure as a result of their shaping.

Advantageously, the first separating element is produced from an elastomer, preferably from ethylene propylene diene rubber. Elastomers are plastics which are dimensionally stable, but elastically deformable. These plastics can therefore deform under tensile and compressive load, but subsequently return to their original, undeformed configuration. Elastomers are thus materials which are particularly well suited for separating elements within the meaning of this disclosure, such as, for example, for the roller diaphragm described above.

The elastomer must retain its elasticity and must not swell up nor shrink excessively. A suitable elastomer must therefore be used for the medium to be sealed off. Ethylene propylene diene rubber, also referred to in short as EPDM, is an elastomer which is resistant to brake medium and therefore is particularly suitable for use in the brake system damping device according to the disclosure.

Moreover, the predefined pressure value is according to the disclosure advantageously predefined with a value between 0 and 30 bar, preferably between range 3 and 10 bar, and particularly preferably with 5 bar. If a brake system applies a pressure of approximately 60 bar on an associated wheel of a vehicle, this reliably brings about a locking of the wheel. However, only a significantly lower, limited pressure range is relevant for vibration and pulsation damping in brake systems. In the case of a reached pressure value of approximately 5 bar, the undesired vibration or pulsation is already adequately damped. The pressure value should therefore be set particularly advantageously to this value.

The passage is furthermore preferably formed with an open-pored material. A material is open-pored if it contains pores which prevent the penetration of fluids, but allows the escape or penetration of gasses. One can talk about a breathable material. The pores would also be closed after bearing against of the first separating element, such as differently configured passages, such as, for example, bores. The advantage of the open-pored material, however, lies in the fact that no fluid can penetrate into the third chamber. The brake system would thus have additional protection against brake fluid running out of the brake system, for example, if the first separating element is damaged or leaking.

Moreover, several passages are preferably provided in the second separating element. These passages ensure a quicker distribution of the medium from the second into the third chamber during the braking process. As a result of this, the elasticity of the entire medium volume can be better exploited.

In a further advantageous embodiment, the third chamber is divided into several sub-chambers which are connected in each case to the second chamber by means of a passage in a medium-conducting manner. The several sub-chambers enable higher flexibility in terms of the use only of a single third chamber. The passages to the individual sub-chambers are thus preferably closed consecutively by means of the first separating element, as a result of which the damping action is gradually reduced, and not completely and suddenly in the case of one predefined pressure value. Moreover, a variable number of sub-chambers and thus a variable medium volume can be used by means of closing passages and making them available again. This facilitates the adjustment of the damper to the relevant pressure region and the desired elasticity.

Moreover, further embodiments are advantageous which make the brake system damping device even more efficient or supplement it with alternative embodiments.

The compressible medium which is contained in the second and third chamber is thus preferably configured as a gas and particularly preferably as air. Air is easily available, can be used and compressed without cost, and is thus highly suitable for use in the brake system damping device according to the disclosure.

The medium volumes or the second and third chamber are alternatively and advantageously produced or created by means of a combination of several turned, cold-formed or deep-drawn parts. Turned parts are components with a circular cross-section, cold-formed parts are closure components and deep-drawn parts are body components of vehicles. All of these components are therefore easy to procure in the automotive sector and are given a new purpose by means of the disclosure.

The brake system damping device is furthermore preferably provided for use in vehicle dynamic controls and/or external power brake systems. A vehicle dynamic control or Electronic Stability Program, also referred to as ESP, is an electronically controlled driver assistance system for a motor vehicle which helps stop the motor vehicle from careering out of control by targeted braking of individual wheels. An external power brake system is operated by means of externally generated force. For example, an electrohydraulically activated brake is an external power brake in the case of which the activation energy comes from a hydraulic pressure accumulator which is charged by a pump.

In one advantageous embodiment, the brake system damping device has a rib structure which supports the second separating element and passes through the third chamber in particular with a structure end side and at least one structure rib. The rib structure is preferably arranged on the second separating element on the side facing away from the first separating element or the side with the separating element outer wall in order to support the second separating element against a pressure which acts on the separating element inner wall. The separating element outer wall thus forms a first end side of the rib structure. The opposite or second end side of the rib structure is formed by the structure end side which is preferably configured to be planar. The structure rib is a carrying element of the supporting rib structure and extends from the separating element outer wall to the structure end side. As a result of the supporting function of the rib structure, the brake system damping device is itself stable. The material of the second separating element is furthermore put under less load, which has a positive effect on its service life.

The rib structure is preferably configured with two or more structure ribs in order to give the rib structure further stability. Moreover, the rib structure is advantageously formed with a vertical circular hollow cylinder which is positioned centrally on the separating element outer wall and extends therefrom up to the second end of the rib structure or the structure end side. A cylinder cavity formed in the circular hollow cylinder is preferably connected to the passage in the second separating element in a medium-conducting manner. At this point, it should be explicitly pointed out that the passage in the second separating element can in no event be closed by the rib structure.

The structure ribs are positioned externally on the circular hollow cylinder and have at these points—referred to below as starting points—an extension or rib depth which corresponds to the length of the circular hollow cylinder. The structure ribs preferably extend from these starting points radially or in a radiant manner away from the circular hollow cylinder, as a result of which a star-shaped structure is created. In this case, the rib depth of each structure rib varies in accordance with the form of the bearing end sides of the rib structure. As already mentioned, the structure end side is preferably planar and therefore does not cause any variation in rib depth. The separating element outer wall in contrast is usually configured to be uneven or three-dimensional. The respective rib depth must then vary or be configured in accordance with the separating element outer wall. The stability of the rib structure is further improved as a result of this.

The rib structure preferably forms at least two structure sub-chambers which are connected to one another by means of at least one connecting channel in a medium-conducting manner. The structure sub-chambers are formed in each case by means of at least one structure rib, the separating element outer wall and a further component which surrounds the third chamber. This component is, as already mentioned above, preferably the cover. The structure sub-chambers are preferably arranged such that a supporting rib structure is generated or the supporting effect of the rib structure is further reinforced. The connecting channel is an opening in an element, preferably a structure rib, which separates the two structure chambers from one another. In this manner, the compressible medium travels from the second chamber into each of the structure sub-chambers of the divided third chamber and a maximum damping thus arises for the brake system damping device. A lower degree of damping can, however, also be set by means of sealing off individual structure sub-chambers or closing individual connecting channels, where desired.

If the rib structure is configured with the circular hollow cylinder, as described above for one advantageous embodiment, a connecting channel preferably leads from this cylinder cavity to each of the structure sub-chambers. In this manner, a uniform spread of the medium and thus an even loading of all regions of the rib structure can be achieved.

As already mentioned above, the compressible medium is preferably configured as a gas, and particularly preferably as air. Therefore, below, the third chamber is also referred to as a second air chamber, the structure sub-chambers are also referred to as air sub-chambers and the medium volume is also referred to as an air volume. Accordingly, the second air chamber was replaced by several connected air sub-chambers which take up an air volume, wherein a desired graduated damping of the brake system damping device can be adjusted by means of the air sub-chambers. In other words, the proposed design offers configuration possibilities for the connection of the air chambers by means of the connecting channels.

Moreover, the second separating element is not only provided to separate the second chamber from the third chamber or from the second air chamber, but also preferably fulfils a holding or carrying function for the first separating element. The first separating element is, as already mentioned above, advantageously configured with a diaphragm. The second separating element is therefore also referred to below as the diaphragm carrier component. An inherently stable diaphragm carrier component which also offers several configuration possibilities of the third chamber or its separation is generated by means of the described rib structure. The described configuration of the diaphragm carrier component furthermore allows the use of low-cost mold-dependent components which can be produced, for example, by means of technologies such as injection molding.

In a further advantageous embodiment, the rib structure has a rib jacket which is configured to surround the rib structure and in particular with a jacket outer wall and a jacket inner wall. The rib jacket is a type of hollow cylinder which encloses the rib structure and extends from the separating element outer wall up to the structure end side. The jacket outer wall bears against the component surrounding the third chamber. The jacket inner wall forms a surface up to which the structure ribs extend. With the rib jacket, the rib structure is configured to be more compact and even more stable.

The rib structure and the rib jacket are preferably configured in one piece, preferably in one piece with the second separating element. In one piece means, as already mentioned, that several elements, here the rib structure with the rib jacket, and preferably also with the second separating element are formed in one piece or as one part. The advantage here lies in simple assembly and low-cost production.

Moreover, the rib jacket is according to the disclosure advantageously configured with at least one jacket slot, wherein the jacket slot is arranged preferably extending from the structure end side in the direction of the separating element outer wall and provided to open the rib jacket toward one of the structure sub-chambers. The jacket slots therefore form recesses in the otherwise fully closed rib jacket. The volume which can be taken up for the compressible medium is increased by means of these recesses or cavities, as a result of which the degree of damping of the brake system damping device is increased. Material is also saved.

The rib jacket is furthermore preferably configured with at least one latching element, wherein the latching element is arranged preferably projecting from the jacket outer wall and preferably on the structure end side. The latching element is a nub or hook which is provided to latch into a recess within the component which surrounds the jacket outer wall. The latching element thus offers the possibility of anchoring the second separating element in the third chamber. The brake system damping device gains additional stability as a result of this.

Building on this, the latching element is arranged bearing against two jacket slots. The two jacket slots lead in each case directly along the latching element, as a result of which a flexible or compressible carrier apparatus is formed for the latching element. The second separating element can thus be mounted more easily or lead to a latching-in position. Particularly if the second separating element is produced from a material which can only be deformed with great difficulty, its assembly is significantly facilitated by means of the formed carrier apparatus.

According to the disclosure, the brake system damping device advantageously has a component which encompasses the rib jacket with a component inner wall in the case of which the component inner wall is configured with a recess which runs around the jacket outer wall, wherein the recess is provided to latch in the latching element. The component is preferably the cover or the housing of the brake system damping device. The component inner wall or a surface of the component which bears against the rib jacket or its jacket outer wall forms, together with the latching hooks arranged on the jacket outer wall, a positive-locking connection between the second separating element or diaphragm carrier component and the surrounding component, preferably the cover. The recess is preferably the depression described above. Since the recess is formed circumferentially in the circumferential component, but the at least one latching element is in contrast configured individually, this positive-locking connection is flexible and position-independent in relation to the latching element.

The structure end side is furthermore arranged bearing against the component inner wall in order to be supported thereon. Bearing against the component inner wall increases the supporting effect of the rib structure and significantly reduces the surface pressure on the component inner wall, preferably the cover. As a result of this, softer and/or lower cost materials can also be used instead of very solid materials, such as preferably composed of machined metal, for the diaphragm carrier component or the second separating element. Expedient mold-dependent components can also thus expediently be used as a diaphragm carrier component.

In one advantageous embodiment, the second separating element is produced by means of injection molding, preferably by means of powder injection molding and particularly preferably by means of metal-powder injection molding. Injection molding, also referred to as an injection molding process, is a manufacturing process, to be more precise a casting process for the production of components. In this case, the respective material is liquefied with an injection molding machine and injected into a mold under pressure. Powder injection molding, also referred to as the PIM method, is a casting process for the production of components composed of metal or ceramic. Consequently, metal-powder injection molding, also referred to as the MIM method, is a casting method for the production especially of metal components. The second separating element or the diaphragm carrier component can be produced very easily and at low cost as a mold-dependent component by means of these technologies.

In one advantageous further development of the disclosure, the brake system damping device has a fourth chamber which is arranged to surround the rib jacket of the second separating element in order to additionally provide damping volume. The fourth chamber is realized in that the component which surrounds the rib jacket, preferably the cover, is configured to be smaller or shorter. The fourth chamber thus forms a further detachable chamber for additional take-up of medium volume, preferably air volume, without increasing the space requirement within the brake system damping device. The larger the available volume is, the more elastic and thus more effective the brake system damping device is in terms of pulsation reduction and damping. This proposed solution thus opens up a possibility of functional optimization without additional outlay and costs.

The second separating element is furthermore configured with a bearing ring enclosing the rib jacket with a ring outer edge, wherein the bearing ring is arranged projecting into the fourth chamber and bearing against the first separating element. The bearing ring bears fixedly against the jacket outer wall of the ring jacket and extends radially from it, preferably as far as the size of the fourth chamber maximally allows. The ring outer edge delimits the bearing ring to the outside and preferably bears against an inner wall of the fourth chamber. With the bearing arrangement of the bearing ring against the first separating element, preferably a diaphragm, the fourth chamber is delimited in the direction of the first separating element and the first separating element is supported and stabilized. This also contributes to the stability of the entire brake system damping device. The second separating element or diaphragm carrier component thus also forms a bearing surface of an externally circumferential sealing region of the first separating element, preferably the diaphragm.

The second separating element is furthermore preferably configured in one piece with the bearing ring. Configured in one piece means, as already mentioned above, that two elements are formed in one piece or as one part, with the advantage of simple assembly and low-cost production.

In a further advantageous further development of the disclosure, at least one ring rib supporting the bearing ring is arranged on the bearing ring. The ring rib is therefore a carrying or supporting element which is arranged preferably not only bearing against the bearing ring, but also against the jacket outer wall of the ring jacket and/or the inner wall of the fourth chamber. The bearing ring is additionally stabilized as a result of this.

Building on this, there are preferably arranged on the bearing ring two or more ring ribs with which the fourth chamber is divided into at least two ring sub-chambers. The ring sub-chambers are advantageously formed in each case by means of two ring ribs, the inner wall of the fourth chamber, the jacket outer wall of the ring jacket and the bearing ring. The ring sub-chambers are chambers which use, for their external radial delimitation, an unchanged interface bore in a component surrounding the fourth chamber, preferably the housing. This new configuration of the second separating element therefore forms on its circumference additional ring sub-chambers, preferably air chambers, which can be used for further reinforcement and adjustability of the damping.

In a further embodiment, the ring ribs on the jacket outer wall are arranged in each case opposite a structure rib on the jacket inner wall. This arrangement, in the case of which the ring ribs form a type of lengthening of the structure ribs, provides additional stability for the second separating element and also simplifies its production.

The jacket slots are preferably arranged in such a manner that they connect the third chamber to the fourth chamber in a medium-conducting manner. By means of this arrangement, the jacket slots act as connecting channels between the structure sub-chambers in the third chamber and the ring sub-chambers in the fourth chamber. In other words, the volume of individual surrounding chambers is coupled by means of longitudinal slots, which are also formed on the latching elements, preferably latching hooks, to the internal volume, preferably air volume, of the rib structure. In this manner, the compressible medium travels from the structure sub-chambers into the ring sub-chambers and the maximum damping for the brake system damping device thus occurs. Moreover, however, a lower degree of damping can also be set here by means of sealing off individual ring sub-chambers or closing individual jacket slots, where desired.

According to the disclosure, the at least one ring rib is advantageously arranged extending from the jacket outer wall to the ring outer edge of the bearing ring. This arrangement effectively exploits the fourth chamber, provides the bearing ring with very high stability and enables a sealing off between the ring sub-chambers.

In a further advantageous further development of the disclosure, the component encompassing the rib jacket has a component outer wall, wherein the component outer wall is placed in a sealing manner against the housing inner wall. The component encompassing the rib jacket is, as already mentioned above, preferably the cover. In one such preferred embodiment, the imperviousness of the brake system damping device is formed toward the outside between housing and the cover. The imperviousness of the brake system damping device is thus ensured particularly sustainably since none of the components under strain during braking processes, such as the first or second separating element, must contribute to imperviousness.

The component encompassing the rib jacket, preferably the cover, is particularly advantageously configured and arranged in such a manner that the ring ribs of the second separating element are latched-in or latched in the cover. As a result of this, the component is additionally fastened or secured in the brake system damping device. The ring sub-chambers are furthermore sealed off from one another better in this manner.

As a result, the housing inner wall is furthermore preferably placed in a sealing manner against the component outer wall in that the component encompassing the rib jacket is inserted into the housing by means of pressing in. Pressing in is a method in which the parts to be connected are substantially only elastically deformed during joining together and unintentional detachment is prevented by a non-positive connection. Non-positive connections require a normal force on the surfaces to be connected to one another. Their mutual displacement is prevented as long as the opposite force brought about by the static friction is not exceeded.

The pressing in is preferably carried out by means of a press-in fastener. The component encompassing the rib jacket, preferably the cover, would thus have to be configured as a press-in fastener. The pressing in of a press-in fastener is also referred to as a self-clinch technique. Press-in fasteners or self-clinching fasteners are self-sealing or self-closing fastening elements which can be attached to metal sheets, substrates or openings in ductile or deformable material without welding or additional fasteners.

In a further advantageous further development of the disclosure, the diaphragm holding apparatus of the second separating element is configured to be spread to the outside in a bead- and/or trumpet-shaped manner. The first separating element is, as a result of this, fixed more solidly and imperviously on the housing inner wall. A movement of the closure element and the diaphragm fold in the direction of the second separating element are thus furthermore guided better and a more positive-locking bearing of the first separating element against the separating element inner wall of the second separating element is facilitated.

BRIEF DESCRIPTION OF THE DRAWINGS

Exemplary embodiments of the solution according to the disclosure are explained in greater detail below on the basis of the enclosed schematic drawings. In the drawings.

DETAILED DESCRIPTION

Figure 1:
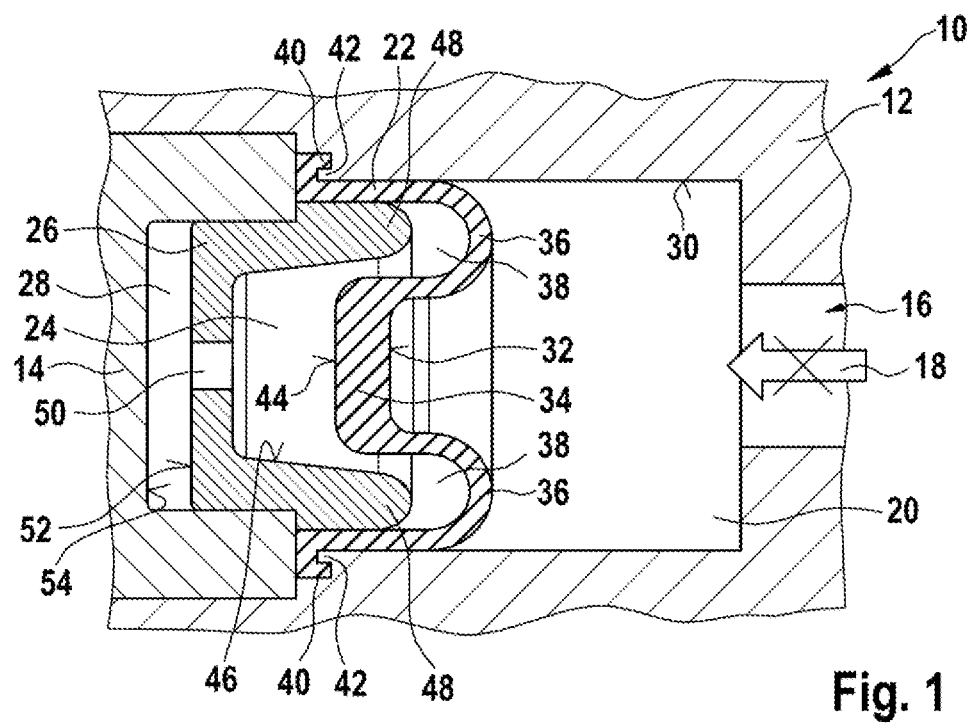
FIG. 1 shows a first exemplary embodiment of a brake system damping device according to the disclosure.

A brake system damping device 10 having a housing 12 and a cover 14 is represented in FIG. 1. There is arranged in housing 12 a supply line 16, in which in the present case no hydraulic pressure is applied, represented by means of a crisscrossed arrow 18. Supply line 16 discharges into a first chamber 20 which adjoins a first separating element 22, here a roller diaphragm. As seen from first chamber 20, a second chamber 24 is located behind first separating element 22, which second chamber 24 is adjoined by a second separating element 26, wherein in the direction of view a third chamber 28 is located behind second separating element 26.

As seen in detail, these chambers 20, 24, 28 and separating elements 22, 26 have the following appearance. First chamber 20 is surrounded by a housing inner wall 30 and a first separating element inner wall 32 of first separating element 22, referred to below as a roller diaphragm. A closure element 34 from which separating element 22 extends further to the outside to a diaphragm fold 36 is arranged to be formed centrally in separating element 22 and formed in one piece with it. A diaphragm fold recess 38 is located within diaphragm fold 36 or is surrounded by it. Adjoining diaphragm fold 36, separating element 22 extends up to a diaphragm collar 40 which engages around a coupling rim 42 of housing 12. Separating element 22 configured as a roller diaphragm bears with a part of its separating element inner wall 32 in a sealing manner against housing inner wall 30, and faces toward second chamber 24 with a first separating element outer wall 44. Second chamber 24 is surrounded by first separating element outer wall 44 and a second separating element inner wall 46 of second separating element 26.

Second separating element 26 extends with a diaphragm retaining apparatus 48 into diaphragm fold recess 38. A passage 50 which connects second chamber 24 to third chamber 28 is arranged centrally in second separating element 26. Passage 50 is guided through second separating element inner wall 46, second separating element 26 and a second separating element outer wall 52. Third chamber 28 is surrounded by second separating element outer wall 52 and a cover inner wall 54 of cover 14.

In the represented starting state of brake system damping device 10, no hydraulic pressure is initially applied in first chamber 20 in which a brake medium is located. Separating element 22, which is produced from an elastomer, is therefore located here substantially in its basic form. In this case, it bears against housing inner wall 30 in such a manner that first chamber 20 is hermetically sealed off from second chamber 24, wherein a gas, here specifically air, is located in second chamber 24. This gas is also located in third chamber 28 which is connected to second chamber 24 by means of passage 50. Both chambers 24, 28 thus form a joint gas volume available for damping. As a result of the greater elasticity of this gas volume, a better damping action is achieved during braking or when applying a hydraulic pressure on first chamber 20.

If a hydraulic pressure is applied in first chamber 20, separating element 22 deforms in such a manner that the gas volume in second chamber 24 is reduced. Closure element 34 moves into second chamber 24. From a specific hydraulic pressure which is set above a pressure range which is relevant for damping, closure element 34 bears against second separating element inner wall 46 of second separating element 26 and closes passage 50 to third chamber 28. Second separating element 26 acts like a stop here. States of brake system damping device 10, in the case of which separating element 22 or closure element 34 thereof against second separating element 26 and closes passage 50, are represented in FIG. 2 and FIG. 3.

As a result of closed passage 50, third chamber 28 is thus separated from second chamber 24, as a result of which only the remaining gas volume in second chamber 24 can be used for the further damping. The elasticity and damping action is only small since second chamber 24 is barely able to take up further volume. This effect is intentional since the travel of a brake pedal connected to the brake system is thus also no longer significantly lengthened. In the case of the state represented in FIG. 3 of brake system damping device 10, separating element 22 and second separating element 26 bear seamlessly or across the full surface against one another so that second chamber 24 disappears entirely or has no volume any more. In this case, the travel of the brake pedal is no longer lengthened.

As soon as the hydraulic pressure applied in first chamber 20 decreases, separating element 22 moves back into its starting state or its starting position.

Figure 2:
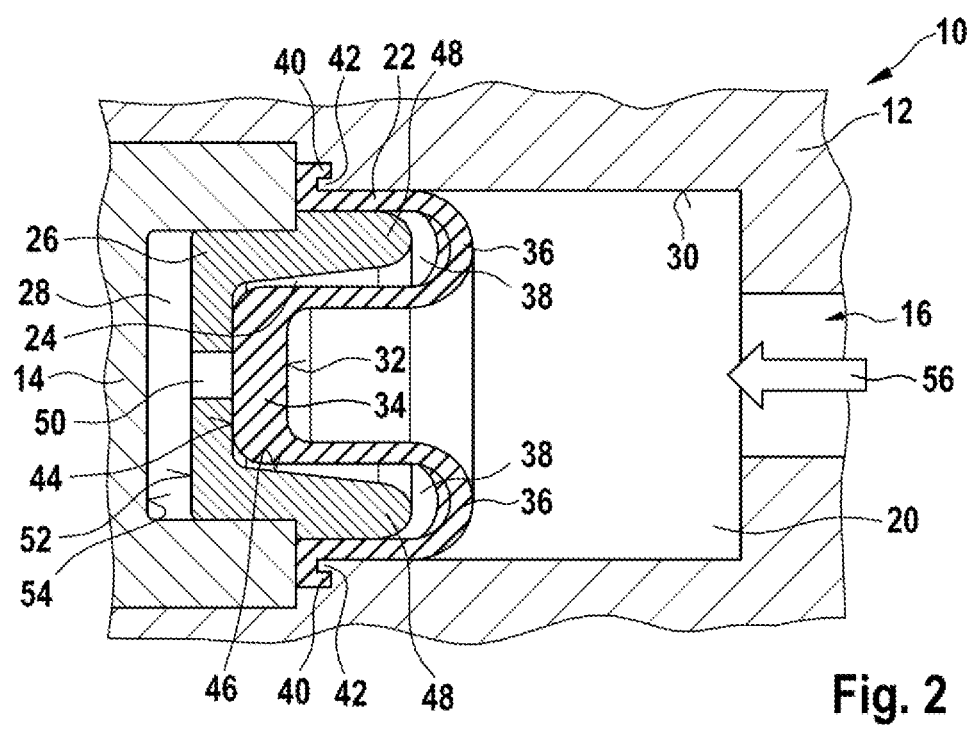
FIG. 2 shows the brake system damping device in FIG. 1 in the case of a first applied hydraulic pressure.
Figure 3:
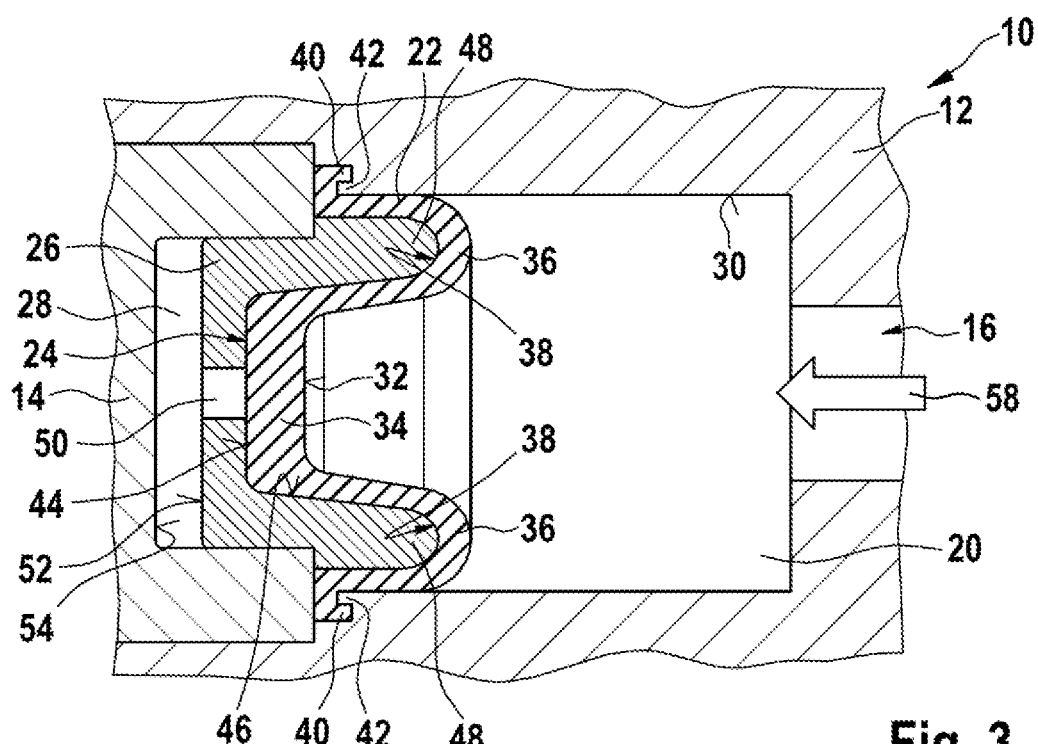
FIG. 3 shows the brake system damping device in FIG. 1 in the case of a second applied hydraulic pressure.

FIG. 2 shows brake system damping device 10 from FIG. 1, but in a state in the case of which a first hydraulic pressure is applied on first chamber 20, represented by means of an arrow 56 in the region of supply line 16.

As already mentioned, closure element 34 bears against second separating element inner wall 46 of second separating element 26 and closes passage 50 to third chamber 28. Only the remaining volume in second chamber 24 can thus be used for the further damping. In the representation of FIG. 2, this is primarily the region around diaphragm retaining apparatus 48. The effects on the damping and the braking process have already been listed in detail in the description relating to FIG. 1 and are therefore not described again here.

FIG. 3 represents brake system damping device 10 from FIG. 1, but in a state in which a second hydraulic pressure is applied on first chamber 20, represented by means of an arrow 58 in the region of supply line 16.

As already mentioned, closure element 34 bears against second separating element inner wall 46 of second separating element 26 and closes passage 50 to third chamber 28. Separating element 22 and second separating element 26 furthermore bear seamlessly against one another so that second chamber 24 no longer has any volume. The effects associated with this on damping and the braking process have already been listed in detail in the description in relation to FIG. 1 and are therefore not described again here.

Figure 4:
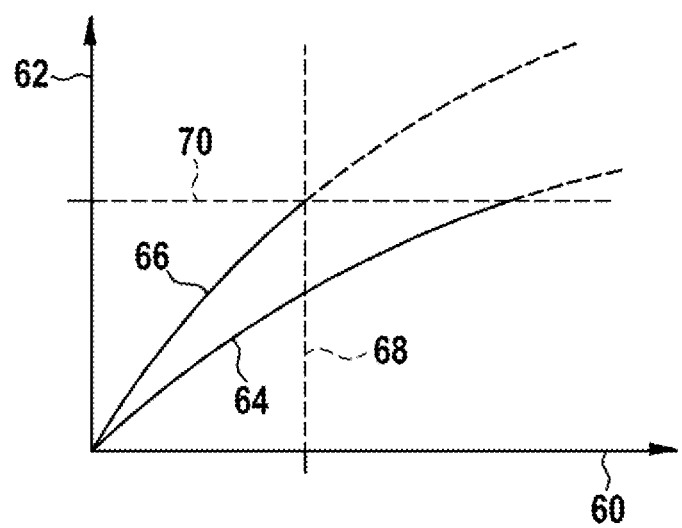
FIG. 4 shows a diagram with characteristic lines as a function of pressure and volume take-up in brake system damping devices and FIG. 5 shows a second exemplary embodiment of a brake system damping device according to the disclosure.

FIG. 4 shows a diagram of the relationship between a pressure 60 and a volume take-up 62 in such brake system damping devices. Here, pressure 60 is plotted on the x-axis and volume take-up 62 is plotted on the y-axis. A first characteristic line 64 and a second characteristic line 66 extend from a coordinate origin of the diagram. The diagram also shows a vertical, dashed line 68 which intersects the x-axis and a horizontal, dashed line 70 which intersects the y-axis.

First characteristic line 64 shows the relationship between pressure and volume take-up for a brake system damping device with a small volume of medium which is available for damping. For the sake of simplicity here, the volume of second chamber 24 in FIG. 1 is assumed for said characteristic line 64.

Second characteristic line 66 which extends above first characteristic line 64 shows the relationship between pressure and volume take-up for a brake system damping device with a comparatively large volume of medium which is available for damping. For the sake of simplicity, the total volume of second and third chamber 24, 28 in FIG. 1 is assumed here for characteristic line 66.

A predefined pressure value 68 which forms the upper limit of a pressure range which is relevant for pulsation damping in such brake systems is represented with vertical, dashed line which intersects the x-axis. This relevant pressure region thus extends from the coordinate origin up to the dashed line.

A volume stop 70 for brake system damping device 10 according to the disclosure is represented with the horizontal, dashed line which intersects the y-axis. This volume stop lies approximately at the volume of second chamber 24 in FIG. 1.

By means of corresponding configuration of the respective volumes of second and third chamber 24, 28, brake system damping device 10 is matched to the relevant pressure range and the desired elasticity or damping action in this pressure range. In the case of optimum matching, as represented in the diagram of FIG. 4, dashed lines 68, 70 intersect with characteristic line 66 at a point.

Figure 5:
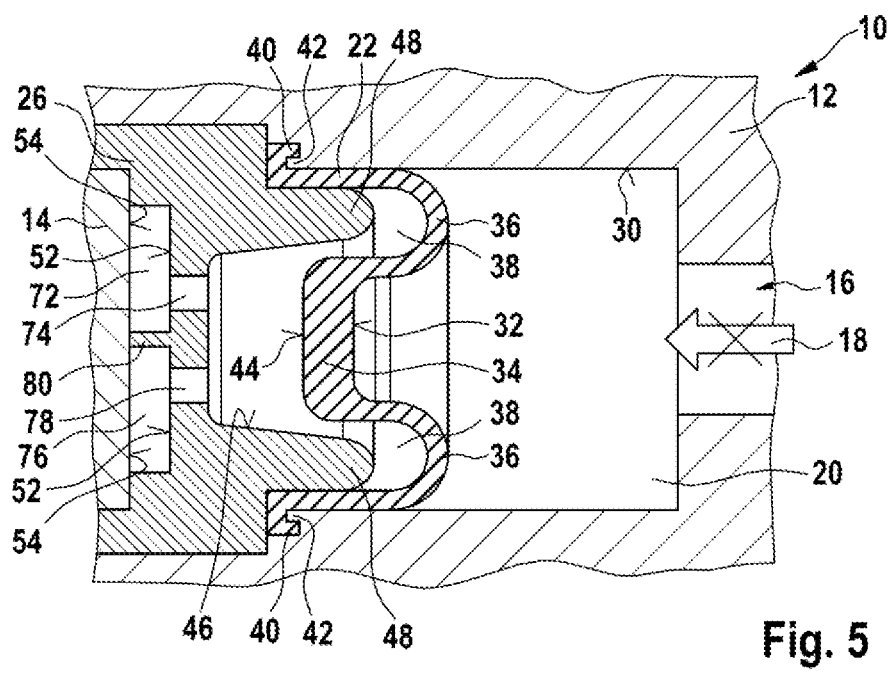

FIG. 5 represents a brake system damping device 10 which differs from that in FIG. 1 only in the region in which first separating wall 22 configured as a roller diaphragm faces with first separating element outer wall 44. Separating element 22 itself and the region which separating element 22 faces with first separating element inner wall 32 correspond entirely with FIG. 1, and are not described again here.

The main difference from brake system damping device 10 in FIG. 1 is that, instead of third chamber 28 and associated passage 50 in FIG. 1, brake system damping device 10 here in FIG. 5 has a first sub-chamber 72 with a passage 74 and a second sub-chamber 76 with a second passage 78. The two sub-chambers 72, 76 are separated by means of a separating wall 80. A further difference to FIG. 1 lies in second separating element 26 extending up to housing inner wall 30 here in FIG. 5 and separating cover 14 from it.

All of the further features correspond to those in FIG. 1. Second chamber 24 is thus also surrounded here by first separating element outer wall 44 and a second separating element inner wall 46 of second separating element 26. Second separating element 26 also extends here with a diaphragm holding apparatus 48 into diaphragm fold recess 38 of separating element 22. Moreover, sub-chambers 72, 76 are next to separating wall 80, like third chamber 28 in FIG. 1, surrounded by second separating element outer wall 52 and a cover inner wall 54 of cover 14.

The mode of operation here is similar to brake system damping device 10 in FIG. 1. If a hydraulic pressure is applied in first chamber 20, separating element 22 also deforms here such that the gas volume in second chamber 24 is reduced. Closure element 34 moves into second chamber 24 and, from a specific hydraulic pressure which ideally corresponds to the upper limit of the relevant pressure region bears against second separating element 26 and closes passages 74, 78 to sub-chambers 72, 76.

As soon as the hydraulic pressure applied in first chamber 20 is reduced, separating element 22 configured as a roller diaphragm moves back into its starting state or its starting position. As a result of this, passages 74, 78 are then opened again and sub-chambers 72, 76 are connected again to second chamber 24.

Figure 6:
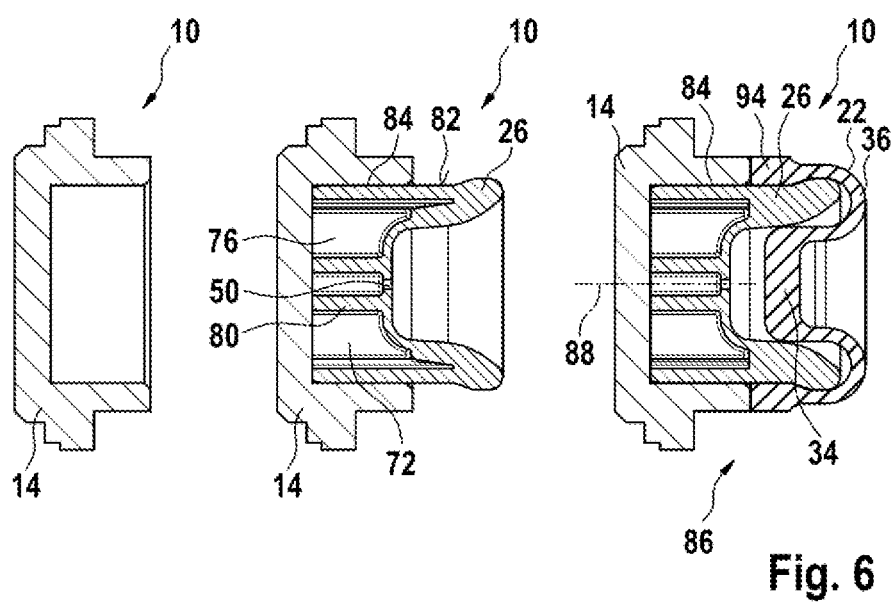
FIG. 6 shows a third exemplary embodiment of a brake system damping device according to the disclosure in three first steps of its mounting.
Figure 7:
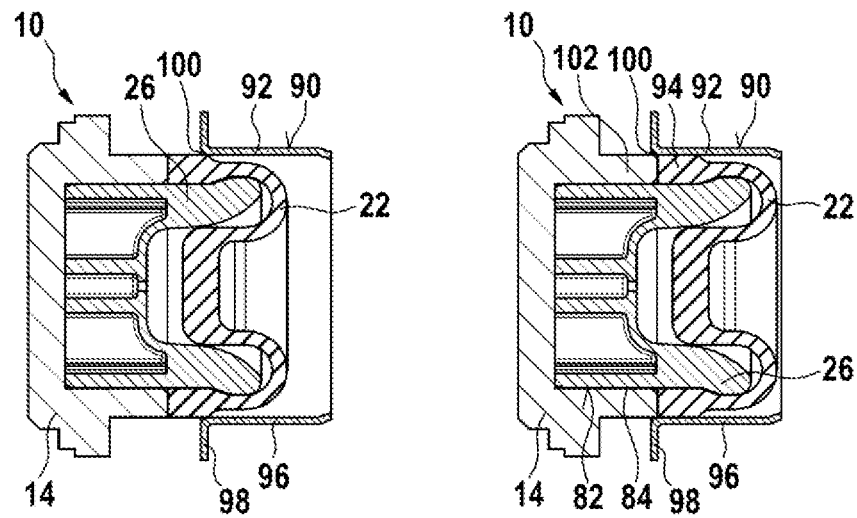
FIG. 7 shows the exemplary embodiment according to FIG. 6 in two further steps of its mounting.
Figure 8:
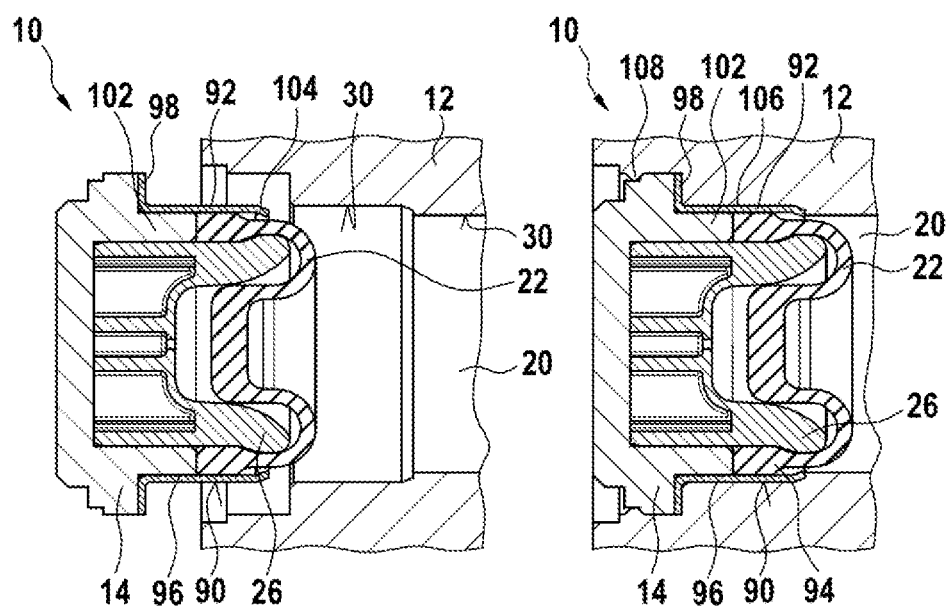
FIG. 8 shows the exemplary embodiment according to FIG. 6 in two last steps of its mounting.

FIGS. 6 to 8 illustrate an exemplary embodiment of a brake system damping device 10 in the case of which the second separating element 26 is likewise configured with a passage 50 and sub-chambers 72 and 76 by means of at least one separating wall 80. The second separating element 26 is furthermore configured, at its jacket outer wall 82 of the third chamber 28, such that said second separating element forms a fluid-tight interference fit 84 with the cover 14 there.

In the case of the brake system damping device 10 as per FIGS. 6 to 8, it is furthermore the case that the first separating element 22 and the second separating element 26 and also the cover 14 are to be preassembled to form an assembly 86 in which the first and second separating elements 22, 26 extends along an axis 88 and the first separating element 22 is covered radially on the outside at least in certain portions by means of a hollow cylindrical sleeve 92, which is pushed onto the first separating element 22.

FIG. 6 shows, on the left, the cover 14 and, in the center, the second separating element 26 pre-mounted thereon by means of the interference fit 84. Furthermore, FIG. 6 shows, on the right, the first separating element 22 pre-mounted onto the second separating element 26 and onto the cover 14. Here, the cover 14 and the first separating element 22 fully enclose the second separating element 26. It is also possible in FIG. 6 to see the two chambers 24 and 28 thus formed. Furthermore, on the first separating element 22, it is possible to see the diaphragm collar 40 thereof and also a sealing bead 94, by means of which the first separating element 22 seals radially at the outside against the second separating element 26 and axially against the cover 14.

FIG. 7 shows the in this case hat-shaped sleeve 92 and the mounting thereof on the preassembled assembly 86 composed of cover 14, second separating element 26 and first separating element 22. The sleeve 92 has a substantially hollow cylindrical jacket wall 96, which extends in an axial direction, and a shoulder 98, which, to the left of said jacket wall as seen in FIG. 7, projects substantially in a radial direction. At the transition from the jacket wall 96 to the shoulder 98, there is formed a radially internal first insertion bevel 100. Said insertion bevel 100 facilitates the pushing of the sleeve 92 onto the first separating element 22 and, there, in particular onto the sealing bead 94 (see FIG. 7, left). With the pushing of the sleeve 92 onto the sealing bead 94, the latter is forced radially against the second separating element 26 and also axially against the cover 14 in order to seal in fluid-tight fashion there. The insertion bevel 100 furthermore also facilitates the further pushing of the sleeve 92 with the jacket wall 96 thereof radially at the outside onto a collar portion 102, which encompasses the second separating element 26 at its jacket outer wall 82, of the cover 14 (see FIG. 7, right). The sleeve 92 is pushed onto the assembly 86 until said sleeve comes to bear with its shoulder 98 against the cover 14.

Finally, FIG. 8 illustrates how the assembly 86 is to be mounted together with the sleeve 92 into the housing 12. Here, it can be seen that the sleeve 92 is equipped, at its end region, facing toward the housing 12, of its jacket wall 96, with a radially external second insertion bevel 104, by means of which the insertion into the bulge, which forms the chamber 20, of the housing 12 is facilitated. As the assembly 86 is inserted together with the sleeve 92, the envelope surface 90 thereof simultaneously protects the first separating element 22 with its sealing bead 94 against damage owing to friction along the housing inner wall 30 (see FIG. 8, left). At the same time, a force-fitting interference fit 106, which seals in fluid-tight fashion, is formed between the envelope surface 90 and the housing inner wall 30.

As the last step of the mounting, cover 14 is fixed externally on housing 12 by means of a caulking 108 and in this manner the arrangement of first separating element 22, second separating element 26, cover 14 and sleeve 92 is arranged in housing 12 in a stationary manner (see FIG. 8, right).

What is claimed is:

1. A brake system damping device, comprising:
    a first chamber on which hydraulic pressure is to be applied;
    a second chamber in which a compressible medium is located;
    a first separating element configured to separate the first chamber from the second chamber;
    a third chamber in which a compressible medium is located;
    a second separating element configured to separate the second chamber from the third chamber, the second chamber connected to the third chamber in a medium-conducting manner by a passage configured in the second separating element; and
    a closure element configured to be moved with the first separating element, the passage configured to be closed by the closure element as soon as the hydraulic pressure in the first chamber has reached a predefined pressure value,
    wherein the first separating element and the second separating element are configured to be preassembled to form an assembly in which the first and second separating elements extend along an axis and the first separating element is covered radially on the outside at least in certain portions by an envelope surface,
    wherein the envelope surface is formed by a hollow cylindrical sleeve disposed on the first separating element, and
    wherein the hollow cylindrical sleeve has a first axial end and a second axial end, the first and second axial ends being open ends.

2. The brake system damping device as claimed in claim 1, wherein the hollow cylindrical sleeve is configured with a radially external interference fit configured to press into a housing that receives the assembly.

3. The brake system damping device as claimed in claim 1, wherein the hollow cylindrical sleeve is configured with a radially internal first insertion bevel configured to facilitate pushing of the envelope surface onto the first separating element.

4. The brake system damping device as claimed in claim 1, wherein the hollow cylindrical sleeve is configured with a radially external second insertion bevel configured to facilitate insertion of the hollow cylindrical sleeve into a housing that receives the assembly.

5. The brake system damping device as claimed in claim 1, wherein the hollow cylindrical sleeve is configured with a radially external shoulder configured for support on a housing that receives the assembly.

6. The brake system damping device as claimed in claim 1, wherein the second separating element is supported by a cover that simultaneously delimits the third chamber.

7. The brake system damping device as claimed in claim 6, wherein the second separating element is fully enclosed by the cover and the first separating element.

8. The brake system damping device as claimed in claim 1, wherein the first separating element has an annular sealing bead that bears in a sealing manner against the second separating element.

9. The brake system damping device as claimed in claim 8, wherein the annular sealing bead bears against a cover that supports the second separating element.

10. The brake system damping device as claimed in claim 1, wherein the first separating element is formed in one piece with the closure element.

11. The brake system damping device as claimed in claim 1, wherein the first separating element is configured with a diaphragm.

12. The brake system damping device as claimed in claim 1, wherein the first separating element is produced from an elastomer.

13. The brake system damping device as claimed in claim 12, wherein the elastomer is ethylene propylene diene rubber.

14. The brake system damping device as claimed in claim 1, wherein the hollow cylindrical sleeve is pushed onto the first separating element to form the envelope surface.

15. The brake system damping device as claimed in claim 1, further comprising:
   a cover that supports the second separating element and delimits the third chamber,
   wherein the first axial end includes a shoulder projecting radially outwardly, the shoulder having a first axial surface that engages the cover.

16. The brake system damping device as claimed in claim 15, wherein the assembly is received in a housing, and the shoulder has a second axial surface that is supported on the housing.

17. The brake system damping device as claimed in claim 16, wherein the first axial end has a first insertion bevel on a radially internal side of the hollow cylindrical sleeve that is configured to facilitate pushing of the envelope surface onto the first separating element, and the second axial end has a second insertion bevel on a radially external side of the hollow cylindrical sleeve that is configured to facilitate insertion of the envelope surface into the housing.

18. The brake system damping device as claimed in claim 1, further comprising:
   a cover that supports the second separating element and delimits the third chamber,
   wherein the first axial end circumferentially surrounds the cover, and the second axial end circumferentially surrounds the first separating element.

* * * * *